Dec. 3, 1963     S. H. PERLMAN     3,113,199
CONTROLLED ATMOSPHERE OVEN
Filed Nov. 9, 1960
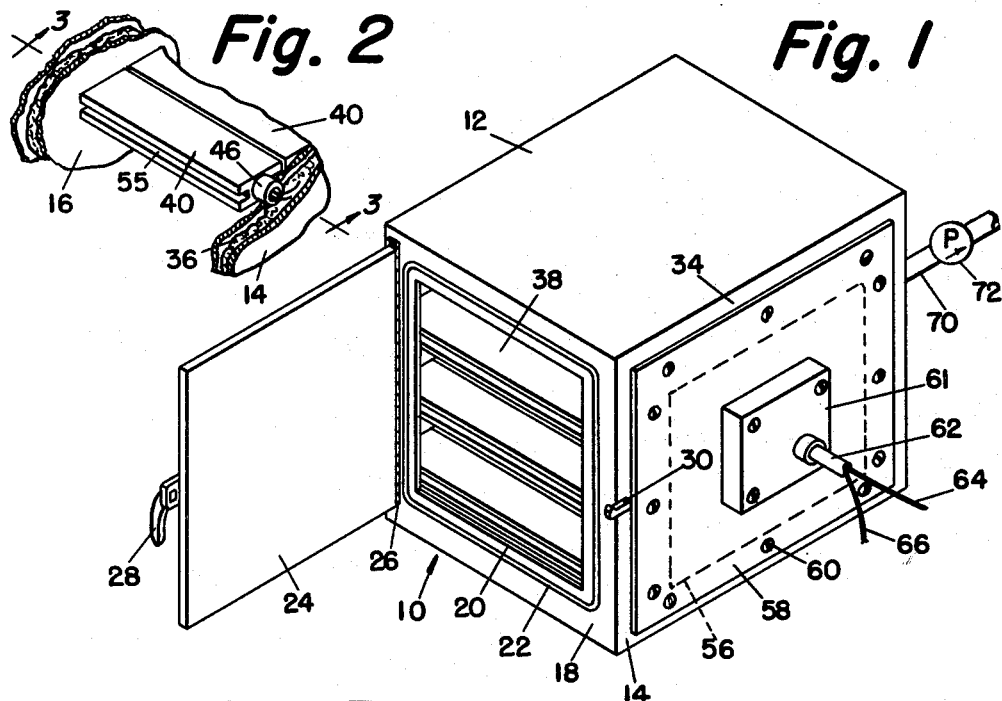
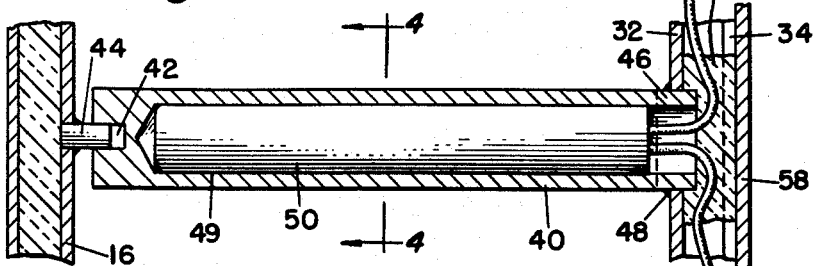
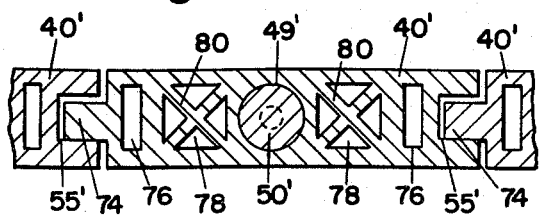
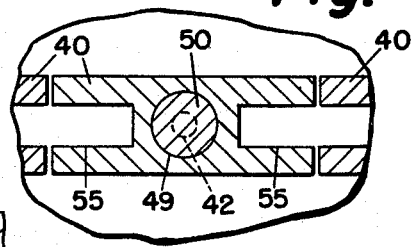
INVENTOR.
SIDNEY H. PERLMAN
BY Arthur H. Seidel
ATTORNEY United States Patent Office 3,113,199
Patented Dec. 3, 1963

3,113,199
CONTROLLED ATMOSPHERE OVEN
Sidney H. Perlman, Wellington Park, Riverton, N.J., assignor to Temperature Engineering Corporation, Riverton, N.J., a corporation of New Jersey
Filed Nov. 9, 1960, Ser. No. 68,241
12 Claims. (Cl. 219—35)

This invention relates to a controlled atmosphere oven, and more particularly, to an oven having a vacuum means connected thereto so that the interior of the oven may be maintained at a pressure substantially below atmospheric pressure.

The present invention is adapted particularly for use in the electronics industry. In the electronics industry, semiconductors such as transistors must be baked in a controlled atmosphere oven. Preferably, the atmosphere within the oven should be controlled by connecting a vacuum pump to the interior of the oven so that the air within the oven does not contain any impurities or moisture.

The present invention is particularly directed to the manner of providing shelves within a controlled atmosphere oven. In the ovens used heretofore, the shelves contain certain drawbacks since they were subject to warping due to poor heat distribution. Also, when a heater coil in the shelves burned out, a great deal of time and effort was expended to replace the burnt heater coil.

The present invention overcomes the above and other drawbacks of the ovens used heretofore.

It is an object of the present invention to provide a novel controlled atmosphere oven.

It is another object of the present invention to provide a novel controlled atmosphere oven having shelves comprised of a plurality of panels which are supported in a novel manner so as to have uniform heat distribution.

It is another object of the present invention to provide a novel controlled atmosphere oven wherein burnt heater cartridges may be quickly and easily replaced.

It is still another object of the present invention to provide a novel controlled atmosphere oven having shelving designed in such a manner so as to substantially eliminate the possibility of warpage.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view of the controlled atmosphere oven of the present invention.

FIGURE 2 is a perspective view, with parts broken away for purposes of illustration, of the heater panels of the present invention.

FIGURE 3 is a longitudinal sectional view of the heater panels of the present invention taken along the lines 3—3 in FIGURE 2.

FIGURE 4 is a transverse sectional view taken along the lines 4—4 in FIGURE 3.

FIGURE 5 is a transverse sectional view of the preferred embodiment of the heater panels for the controlled atmosphere oven of the present invention.

Referring to the drawing in detail, wherein like numerals indicate like elements, there is shown in FIGURE 1 a controlled atmosphere oven designated generally as 10.

The oven 10 comprises a generally rectangular housing 12 having a top wall, a bottom wall, a rear wall, a side wall 14, a side wall 16, and a front wall 18. The front wall 18 is provided with a rectangular opening 20 for providing access to the interior of the oven 10.

The front wall 18 is provided with a groove which surrounds the opening 20. A resilient seal 22 is disposed within the groove around the opening 20. The resilient seal 22 is preferably an O-ring. A door 24 is pivotably mounted on the front wall 18 by a hinge 26. The door 24 cooperates with the O-ring 22 in the closed disposition of the door 24, to provide an air-tight closure means for the oven 10. The door 24 is provided with a handle 28 which cooperates with the latch 30 in the opening and closing movement of the door 24.

As seen more clearly in FIGURE 3, the side wall 14 comprises an inner partition 32 and an outer partition 34. A flexible insulation 36 such as glass wool, rock wool, etc. is disposed intermediate the inner partition 32 and the outer partition 34.

The oven 10 is provided with a plurality of shelves 38. Three such shelves are shown in FIGURE 1. However, a greater or lesser number of shelves may be provided if desired. Each shelf 38 comprises a plurality of heater panels 40 which are juxtaposed to one another in the manner shown in FIGURES 2 and 4.

Each of the panels 40 are supported at their ends within the oven 10 as will be made clear hereinafter. Each panel 40 is provided with a blind hole 42 at one end. A stud 44 is fixedly secured to the inner partition of the side wall 16. The stud 44 is received within the blind hole 42 as shown more clearly in FIGURE 3. The panels 40 and the hole 42 are dimensioned so that the stud 44 does not extend for the full depth of the blind hole 42. In this manner, longitudinal expansion due to heat is provided for each of the panels 40.

The opposite ends of the panels 40 are each provided with an annular boss 46. Each of the bosses 46 are rigidly secured in the inner partition 32. As shown more clearly in FIGURE 3, the inner partition 32 is provided with a hole through which the boss 46 extends. The boss 46 may be rigidly secured to the inner partition 32 in any convenient manner such as by the weld 48.

Each of the panels 40 are provided with a longitudinally extending blind hole 49. The hole 49 is disposed equidistant from the side edges of the panel 40 and equidistant from the upper and lower planar surfaces of the panel 40. A heater cartridge 50 is disposed within the blind hole 49 in each heater panel 40. The heater cartridge 50 is commercially available and, per se, forms no part of the present invention. Lead wires 52 and 54 extend from the heater cartridge 50 through the insulation 36 intermediate the inner partition 32 and the outer partition 34.

The outer partition 34 is provided with a generally rectangular opening or hole 56. In the assembled condition of the oven 10, a generally rectangular planar faceplate 58 is disposed over the opening 56 in the outer partition 34. The faceplate 58 is retained on the outer partition 34 by a plurality of retainer elements such as the screws 60. The faceplate 58 is provided on its outermost surface with a terminal box 61. An electrical conduit 62 extends from the terminal box 61 and contains the lead wires 64 and 66 which deliver electrical power to the heater cartridge 50 by way of the lead wires 52 and 54. The lead wires 52 and 54 from each of the heater cartridges 50 are electrically connected to the wires 64 and 66 within the terminal box 61.

The interior of the oven 10 is maintained under subatmosphere conditions by a vacuum means. The vacuum means includes a vacuum pipe 70 which is in communication with the interior of the oven 10. A vacuum pump 72 is disposed within the vacuum pipe 70.

Each of the heater panels 40 are juxtaposed to one another so that their upper planar surfaces form a substantially continuous planar shelf. The slight gap intermediate juxtaposed heater panels 40 and the longitudinally extending grooves 55 provide for even heat distribution so as to prevent warping of the shelves 38. As seen more clearly in FIGURE 4, the heater panel 40 is provided with a substantially uniform cross section in all directions.

The preferred heater panels for use in the oven 10 of the present invention are preferably of the type shown in FIGURE 5 and designated as 40'. The heater panels 40' differ from the heater panels 40 since the heater panels 40' are disposed with their side edges in interlocking relationship. Each of the heater panels 40' are provided with a longitudinally extending groove 55' which receives the tongue 74 of the next adjacent heater panel. The height of the tongue 74 is less than the height of the groove 55'. The heater panels 40' are mounted so that the tongue 74 does not extend to the full depth of the grooves 55'. In this manner, heat expansion may take place in substantially all directions.

The heater panels 40' are preferred since they are substantially wider than the heater panels 40. Therefore, fewer heater panels are required to make a shelf 38. The heater panels 40' are provided with longitudinally extending holes 76 which are spaced inwardly from the groove 55' and the tongue 74 by a distance equal to the effective thickness of the heater panels 40'. A plurality of triangular shaped holes 78 extend longitudinally along the heater panels 40' so as to provide a truss 80 between each of the holes 76 and the heater cartridge 50'.

The inner panels 40' are supported within the oven 10 in the same manner as the heater panels 40. Each of the heater panels 40 and 40' are made from a good heat conducting material such as aluminum.

The manner in which the oven 10 of the present invention is used should be obvious and need not be described in detail. The semi-conductors are positioned on the uppermost surface of the shelves 38 and baked within the oven 10 under sub-atmospheric pressures. The construction of the heater panels 40 and 40' eliminates warpage of the shelves 38 and convey by conduction substantially the same amount of heat to each of the semi-conductors.

If one of the heater cartridges 50 or 50' should burn out or otherwise become defective, the cartridge is removed as follows. The terminal box 61 is removed and the male and female plugs are separated. The faceplate 58 is removed by unthreading the screws 60. The insulation 36 is then removed thereby exposing the lead wires 52 and 54 for each of the heater cartridges. The opening 56 in the outer partition 34 is of sufficient size so that each of the heater cartridges is readily accessible for removal and replacement.

When a heater cartridge has been replaced, the procedure in the next preceding paragraph is followed in the reverse order, whereby the oven 10 can be placed back in production within a very short interval of time.

It is to be noted that the oven 10 of the present invention eliminates the provision of heater coils within the walls of the housing 12 as was conventional heretofore. The provision of heater coils within the walls of the housing 12 did not provide an even distribution of heat to each of the semi-conductors, was inefficient since a great deal of the heat was lost to the atmosphere, and rapidly caused the deterioration of the O-ring seal on the front wall of the housing thereby necessitating a cooling system for the O-ring seal. The oven 10 of the present invention overcomes each of these defects in the ovens used heretofore. When the heater coils were mounted within a wall of the housing 12, it was a tedious job to replace a burnt heater coil and resulted in the particular ovens being out of production for a substantial period of time.

While the stud 44 is fixedly secured to the inner partition of the wall 16, and is disposed within the blind hole 42 on the heater panel 40, it will be appreciated that the stud 44 may be fixedly secured to the heater panel 40 and extend through a hole in the inner partition of the wall 16.

The present invention may be embodied in other specific forms without departing from the spirit or essential attributes thereof and, accordingly, reference should be made to the appended claims, rather than to the foregoing specifications as indicating the scope of the invention.

I claim:
1. A controlled atmosphere oven comprising a housing having an opening in a wall thereof, a resilient seal in said wall around said opening, a door disposed for cooperation with said seal for selectively closing said opening, at least one shelf in said housing, said shelf comprising a plurality of juxtaposed substantially solid panels, an elongated substantially straight heater cartridge in each panel, each of said panels being provided with a means to provide for uniform heat distribution, said panels having a mounting means at their ends for supporting said panels in said housing, and means connected to said housing for controlling the atmosphere in said housing.

2. A controlled atmosphere oven in accordance with claim 1 wherein said means for providing for uniform heat distribution in each of said panels includes the walls of said panels which have a substantially uniform thickness in transverse cross section, so that the walls of said panels expand and contract at the same rate, whereby each of said panels will convey substantially the same amount of heat by conduction to elements which are to be supported on said panels within said housing.

3. A controlled atmosphere oven in accordance with claim 1 wherein said mounting means includes a blind hole in one end of each panel, and a stud fixedly secured to said housing being partially disposed within each of said blind holes.

4. A controlled atmosphere oven in accordance with claim 3 wherein said mounting means also includes a boss at the other end of each of said panels, said bosses being rigidly secured to said housing.

5. A controlled atmosphere oven in accordance with claim 1 wherein each heater cartridge is disposed within a blind hole extending from one end of each of said panels, each heater cartridge being electrically connected to a terminal box on said housing.

6. A controlled atmosphere oven comprising a housing having an opening in a wall thereof, a resilient seal in said wall around said opening, a door disposed for cooperation with said seal for selectively closing said opening, at least one shelf in said housing, said shelf comprising a plurality of juxtaposed panels, heater means in each panel, each of said panels being provided with a means to provide for uniform heat distribution, said panels having a mounting means at their ends for supporting said panels in said housing, means connected to said housing for controlling the atmosphere in said housing, said heater means being a heater cartridge disposed within a blind hole extending from one end of each of said panels, each heater cartridge being electrically connected to a terminal box on said housing, a wall of said housing being provided with an opening, each of said heater cartridges being disposed within the perimeter of said opening, a faceplate removably secured to said last mentioned wall, said faceplate having a perimeter substantially larger than the perimeter of said opening, and said terminal box being removably secured to said faceplate, whereby each of said heater cartridges may be exposed by removal of said faceplate.

7. A controlled atmosphere oven comprising a housing having an opening in a wall thereof, a resilient seal in said wall around said opening, a door disposed for cooperation with said seal for selectively closing said opening, at least one shelf in said housing, said shelf comprising a plurality of juxtaposed panels, heater means in each panel, each of said panels being provided with a means to provide for uniform heat distribution, said last mentioned means including the walls of said panels which have a substantially uniform thickness in transverse cross section, so that the walls of said panels expand and contract at the same rate, whereby each of said panels will convey substantially the same amount of heat by conduction to elements which are supported on said panels within said housing, said panels having a mounting means at their ends for supporting said panels in said housing, means connected to said housing for controlling the atmosphere in said housing, and each of said panels being provided with a longitudinally extending groove along one edge thereof.

8. A controlled atmosphere oven in accordance with claim 7 wherein the next adjacent panel is provided with a tongue partially extending into said last mentioned groove, with each of said panels being provided with longitudinally extending holes on each side of the heater means in each panel.

9. A controlled atmosphere oven in accordance with claim 7 wherein the next adjacent panel is provided with a groove juxtaposed to said last mentioned groove.

10. A controlled atmosphere oven comprising a generally rectangular housing having an opening in a front wall, an O-ring seal in said front wall disposed around said opening, a pivotably mounted door disposed for cooperation with said seal for selectively closing said opening, a plurality of shelves in said housing, each shelf comprising a plurality of juxtaposed panels, an elongated substantially straight heater cartridge means in each panel, each of said panels being provided with a means to provide for uniform heat distribution, each of said panels being mounted within said housing with only the ends of said panels being supported, and movable means on said housing for simultaneously exposing one end of each cartridge means thereby facilitating rapid replacement of burnt or defective cartridges.

11. A controlled atmosphere oven in accordance with claim 10 wherein only one end of said panels is rigidly secured to said housing, and the other end of said panels being mounted in a manner which accommodates for the expansion of said panels when said panels are heated by said heater means in each panel.

12. A controlled atmosphere oven in accordance with claim 10 said last mentioned means being an opening in one of the side walls of said housing, a faceplate removably secured over said last mentioned opening, each cartridge means being disposed within the perimeter of said opening, whereby each of said heater means are readily accessible by removing said faceplate.

References Cited in the file of this patent
UNITED STATES PATENTS

| | | |
|---|---|---|
| 2,040,675 | Shroyer | May 12, 1936 |
| 2,683,795 | Sheidler | July 13, 1954 |

OTHER REFERENCES

Henkhaus, German application, 1,077,460 (KL 421 13/01), printed Mar. 10, 1960.